(12) United States Patent
Shwartz et al.

(10) Patent No.: US 11,272,056 B2
(45) Date of Patent: Mar. 8, 2022

(54) ARTIFICIAL-INTELLIGENCE POWERED SKILL MANAGEMENT SYSTEMS AND METHODS

(71) Applicant: NICE LTD., Ra'anana (IL)

(72) Inventors: Ifat Shwartz, Kfar-Saba (IL); Tal Raskin, Ramle (IL); Michael Segal, Hadera (IL); Natan Katz, Tel Aviv (IL)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 16/864,376

(22) Filed: May 1, 2020

(65) Prior Publication Data
US 2021/0344800 A1 Nov. 4, 2021

(51) Int. Cl.
| | |
|---|---|
| H04M 3/52 | (2006.01) |
| H04M 3/51 | (2006.01) |
| G06Q 10/06 | (2012.01) |
| H04M 3/523 | (2006.01) |
| G06Q 30/00 | (2012.01) |
| G06N 20/00 | (2019.01) |

(52) U.S. Cl.
CPC .... *H04M 3/5175* (2013.01); *G06Q 10/06393* (2013.01); *G06Q 10/06398* (2013.01); *G06Q 10/063112* (2013.01); *G06Q 30/016* (2013.01); *H04M 3/5233* (2013.01); *G06N 20/00* (2019.01); *H04M 2203/401* (2013.01); *H04M 2203/403* (2013.01)

(58) Field of Classification Search
CPC ............ H04M 3/5175; H04M 3/5233; G06Q 10/063112; G06Q 10/06393; G06Q 10/06398; G06Q 30/016
See application file for complete search history.

(56) References Cited

U.S. PATENT DOCUMENTS

| | | | |
|---|---|---|---|
| 6,349,309 B1 * | 2/2002 | Aggarwal | G06F 16/285 |
| 6,704,410 B1 | 3/2004 | McFarlane et al. | |
| 6,978,006 B1 * | 12/2005 | Polcyn | G06Q 10/0631 |
| | | | 379/265.12 |
| 7,372,952 B1 * | 5/2008 | Wu | H04M 3/5233 |
| | | | 370/352 |
| 2007/0198329 A1 * | 8/2007 | Lyerly | G06Q 10/063116 |
| | | | 705/7.16 |
| 2012/0195422 A1 * | 8/2012 | Famous | H04M 3/5191 |
| | | | 379/265.09 |
| 2016/0295019 A1 * | 10/2016 | O'Connor | H04M 3/5233 |
| 2017/0111509 A1 * | 4/2017 | McGann | H04M 3/5232 |
| 2018/0091654 A1 * | 3/2018 | Miller | G06Q 50/2057 |

* cited by examiner

*Primary Examiner* — Ahmad F. Matar
*Assistant Examiner* — Jirapon Intavong
(74) *Attorney, Agent, or Firm* — Haynes and Boone LLP (57) ABSTRACT

Methods for routing customers to an agent include receiving a customer communication; representing the customer communication as an array of one or more agent skills desired to handle the customer communication in one hot coding format or as a vector with an induced metric using an embedding algorithm; routing the represented customer communication to an agent having the one or more agent skills; measuring performance of the agent in relation to the one or more agent skills during or after the customer communication; updating, in real-time, one or more performance scores of the agent in a skill profile, wherein the one or more performance scores are related to the one or more agent skills; and routing subsequent customer communications based on the updated one or more performance scores.

17 Claims, 8 Drawing Sheets

ARTIFICIAL-INTELLIGENCE POWERED SKILL MANAGEMENT SYSTEMS AND METHODS

TECHNICAL FIELD

The present disclosure relates generally to routing customers to agents associated with a contact center, and more specifically to a system and method that monitors and estimates agent performance.

BACKGROUND

Agents are assigned skills based on special knowledge to route interactions to the right person and to balance workload. Adding or modifying agent skills and proficiencies is done manually by a human supervisor and can be time consuming for supervisors. New digital skills increase the complexity in skill assignments for supervisors. Upon deciding that an agent possesses a certain skill, the agent can receive every communication that is related to this skill.

An agent's skill level, however, is valid for only as long as the agent's skill has not changed. Thus, the measurement and monitoring process must be continuous to determine the agent's current skill level. Unfortunately, there is no simple way to estimate an agent's skill level using continuous quantifiable measures (e.g., key performance indicators (KPIs)). Therefore, supervisors rarely change an agent's skills or train an agent. If such an action is taken, it is typically based on a subjective opinion, rather than based on an objective determination.

Accordingly, a need exists for improved methods and systems for monitoring agent skill levels, and using these skill levels to route customers to agents.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one of ordinary skill in the art.

In this description, specific details are set forth describing some embodiments consistent with the present disclosure. Numerous specific details are set forth in order to provide a thorough understanding of the embodiments. It will be apparent, however, to one of ordinary skill in the art that some embodiments may be practiced without some or all of these specific details. The specific embodiments disclosed herein are meant to be illustrative but not limiting. One of ordinary skill in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

The present disclosure describes how skills and proficiencies are assigned and updated automatically for an agent based on data analysis using reinforcement learning (RL), which makes the assignment and updating of skills more accurate, can increase supervisor efficiency, and improves communication routing. The methods described herein offer the ability to measure the performance of an agent online, leading to more accurate determinations of skill levels and removing manual efforts. The methods leverage artificial intelligence (AI)/machine learning algorithms to automatically identify and score agent skills based on transcription categorization on successful versus failed agent interactions across all channels (e.g., voice and digital) in real-time utilizing RL without any manual intervention from supervisors.

RL is the training of machine learning models to make a sequence of decisions to maximize the reward in a particular situation. It is employed by various software and machines to find the best possible behavior or path that should be taken in a specific situation. The main power of RL is its ability to identify and quantify a specific skill of an agent and its ability to identify changes in his/her performance over time or during a time period.

Advantageously, the present systems and methods reveal the weaknesses and strengths of an agent. The systems and methods use the strengths of the agent to offer customer communications to the agent that the agent is likely to handle in a short duration and use the weaknesses of the agent to provide training to the agent. RL is an optimal tool for such needs due to its sensitivity to traffic fluctuations (i.e., changes in system load).

In the present methods, the skills of the agent are the various options that can be selected. For each agent profile, values for each skill are assigned. A reward function (e.g., handle time, solution criterion, or any other KPI) is defined. A customer communication with a given label or categorization (e.g., financial, technical, tenure) is provided to an agent having the requisite skill. The reward function (e.g., KPI) is calculated for the customer-agent interaction, and the agent profile is updated for the relevant skill. As time goes on, statistical knowledge about the skills of the agent is compiled, and the profile of the agent is continuously updated. This knowledge is then used to determine where to route future communications.

According to an exemplary embodiment, a customer communication in its categorical representation is received.

An available agent having the requisite skill(s) to handle the customer communication is assigned the customer communication. During or after the communication, a value for a KPI (e.g., handling time, satisfaction score, etc.) is calculated. The KPI value is used to update the skills of the agent.

In several embodiments, the KPI value is compared to a threshold value. If the KPI value is greater than the threshold value, the match of the customer and the agent is successful, and the agent is likely to receive similar customer communications. If the KPI value is less than the threshold value, management may be alerted. The probability that the agent will be offered similar communications in the future is reduced. If the agent continuously receives KPI values lower than the threshold value, management may be alerted and training (and in extreme cases, removal of the skill from the agent's profile) may be recommended.

Figure 1:
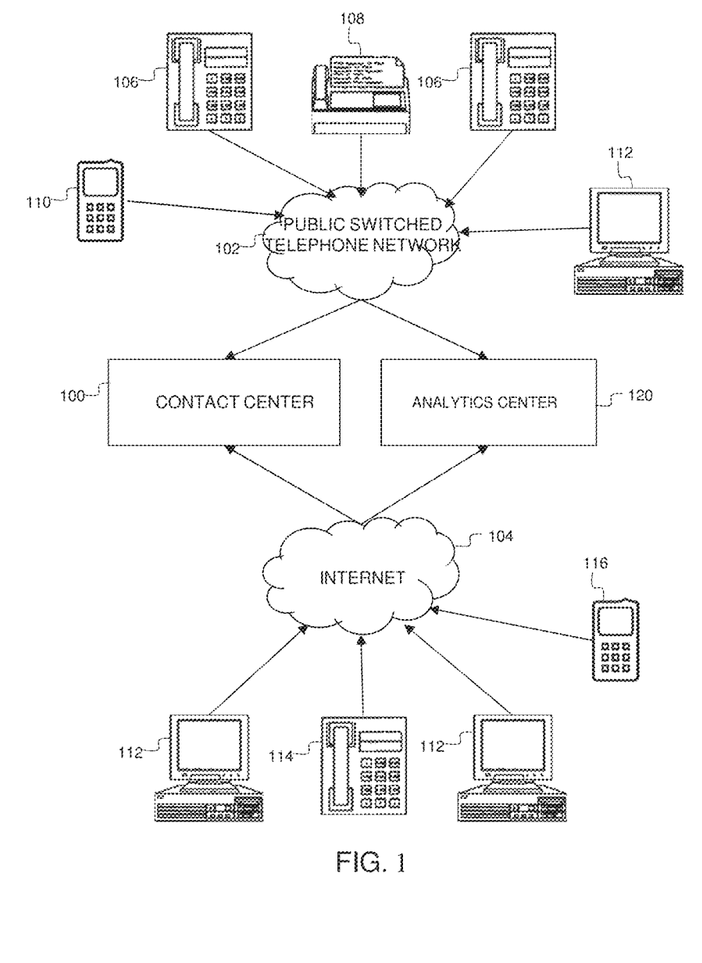
FIG. 1 is a simplified block diagram of an embodiment of a contact center according to various aspects of the present disclosure.

FIG. 1 is a simplified block diagram of an embodiment of a contact center 100 according to various aspects of the present disclosure. The term "contact center," as used herein, can include any facility or system server suitable for receiving and recording electronic communications from customers. Such customer communications can include, for example, telephone calls, facsimile transmissions, e-mails, web interactions, voice over IP ("VoIP") and video. Various specific types of communications contemplated through one or more of these channels include, without limitation, email, SMS data (e.g., text), tweet, instant message, web-form submission, smartphone app, social media data, and web content data (including but not limited to internet survey data, blog data, microblog data, discussion forum data, and chat data), etc. In some embodiments, the communications can include customer tasks, such as taking an order, making a sale, responding to a complaint, etc. In various aspects, real-time communication, such as voice, video, chat, or a combination such as voice and video, is preferably included. It is contemplated that these communications may be transmitted by and through any type of telecommunication device and over any medium suitable for carrying data. For example, the communications may be transmitted by or through telephone lines, cable, or wireless communications. As shown in FIG. 1, the contact center 100 of the present disclosure is adapted to receive and record varying electronic communications and data formats that represent an interaction that may occur between a customer (or caller) and a contact center agent during fulfillment of a customer and agent transaction. In one embodiment, the contact center 100 records all of the customer calls in uncompressed audio format(s). In the illustrated embodiment, customers may communicate with agents associated with the contact center 100 via multiple different communication networks such as a public switched telephone network (PSTN) 102 or the Internet 104. For example, a customer may initiate an interaction session through traditional telephones 106, a fax machine 108, a cellular (i.e., mobile) telephone 110, a personal computing device 112 with a modem, or other legacy communication device via the PSTN 102. Further, the contact center 100 may accept internet-based interaction sessions from personal computing devices 112, VoIP telephones 114, and internet-enabled smartphones 116 and personal digital assistants (PDAs).

Often, in contact center environments such as contact center 100, it is desirable to facilitate routing of customer communications, particularly based on agent availability, prediction of profile (e.g., personality type) of the customer occurring in association with a customer interaction, matching of customer attributes to agent attributes, and/or matching of customer needs to current agent skills, be it a telephone-based interaction, a web-based interaction, or other type of electronic interaction over the PSTN 102 or Internet 104.

As one of ordinary skill in the art would recognize, the illustrated example of communication channels associated with a contact center 100 in FIG. 1 is just an example, and the contact center may accept customer interactions, and other analyzed interaction information and/or routing recommendations from an analytics center, through various additional and/or different devices and communication channels whether or not expressly described herein.

For example, in some embodiments, internet-based interactions and/or telephone-based interactions may be routed through an analytics center 120 before reaching the contact center 100 or may be routed simultaneously to the contact center and the analytics center (or even directly and only to the contact center). Also, in some embodiments, internet-based interactions may be received and handled by a marketing department associated with either the contact center 100 or analytics center 120. The analytics center 120 may be controlled by the same entity or a different entity than the contact center 100. Further, the analytics center 120 may be a part of, or independent of, the contact center 100.

Figure 2:
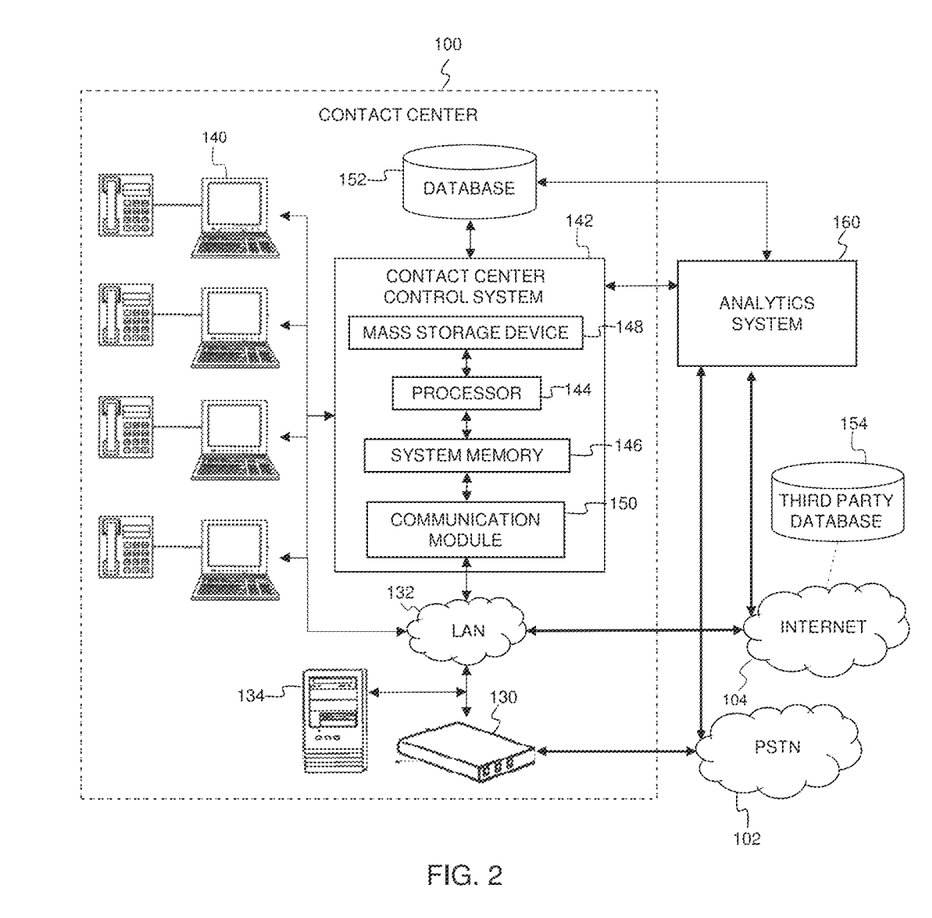
FIG. 2 is a more detailed block diagram of the contact center of FIG. 1 according to aspects of the present disclosure.

FIG. 2 is a more detailed block diagram of an embodiment of the contact center 100 according to aspects of the present disclosure. As shown in FIG. 2, the contact center 100 is communicatively coupled to the PSTN 102 via a distributed private branch exchange (PBX) switch 130 and/or ACD 130. The PBX switch 130 provides an interface between the PSTN 102 and a local area network (LAN) 132 within the contact center 100. In general, the PBX switch 130 connects trunk and line station interfaces of the PSTN 102 to components communicatively coupled to the LAN 132. The PBX switch 130 may be implemented with hardware or virtually. A hardware-based PBX may be implemented in equipment located local to the user of the PBX system. In contrast, a virtual PBX may be implemented in equipment located at a central telephone service provider that delivers PBX functionality as a service over the PSTN 102. Additionally, in one embodiment, the PBX switch 130 may be controlled by software stored on a telephony server 134 coupled to the PBX switch. In another embodiment, the PBX switch 130 may be integrated within telephony server 134. The telephony server 134 incorporates PBX control software to control the initiation and termination of connections between telephones within the contact center 100 and outside trunk connections to the PSTN 102. In addition, the software may monitor the status of all telephone stations coupled to the LAN 132 and may be capable of responding to telephony events to provide traditional telephone service. In certain embodiments, this may include the control and generation of the conventional signaling tones including without limitation dial tones, busy tones, ring back tones, as well as the connection and termination of media streams between telephones on the LAN 132. Further, the PBX control software may programmatically implement standard PBX functions such as the initiation and termination of telephone calls, either across the network or to outside trunk lines, the ability to put calls on hold, to transfer, park and pick up calls, to conference multiple callers, and to provide caller ID information. Telephony applications such as voice mail and auto attendant may be implemented by application software using the PBX as a network telephony services provider.

ACD 130 distributes customer communications or tasks to agents. Generally, ACD 130 is part of a switching system designed to receive customer communications and queue them. In addition, ACD 130 as shown distributes communications to agents or specific groups of agents typically according to a prearranged scheme. In one embodiment, ACD 130 is integrated with PBX switch 130, and directs customer communications to one of a plurality of agent workstations 140.

ACDs are specialized systems that are configured to match customer communications to an available contact center agent. ACDs generally receive incoming communications, determine where to route a particular customer communication, and connect the customer communication to an available agent. For the purposes of the present disclosure, "ACD" refers to any combination of hardware, software and/or embedded logic that is operable to automatically distribute incoming communications, including requests for service transmitted using any audio and/or video means, including signals, data or messages transmitted through voice devices, text chat, web sessions, facsimile, instant messaging and e-mail.

According to an exemplary embodiment, ACD 130 includes a processor, a network interface, and a memory module or database. The network interface joins ACD 130 with LAN 132. Once ACD 130 receives a customer communication, the processor determines which of a plurality of agents should receive the communication. For example, the processor may access the memory module, which stores code executed by the processor to perform various tasks.

In various embodiments, the processor includes a plurality of engines or modules. Examples of suitable engines include a distributor engine, a queue engine, and a monitor engine. The distributor engine distributes incoming customer communications to available agents, the queue engine monitors and maintains customer communications that are waiting to be connected to agents, and the monitor engine checks the status and skills of agents and stores appropriate information in the memory module.

The memory module stores various information about agents at the contact center, including, but not limited to, agent skills or attributes, agent location, and agent availability. Various alternative embodiments of ACD 130 may store different or additional information useful for communication routing as well. Over time, the monitor engine updates agent skills information, location information, and availability based on changes in agent status detected.

Generally, ACD 130 receives incoming communications that may be handled by one of the agents at the contact center. The distributor engine connects each communication to an appropriate available agent if the agent is available. If the agent is not available, the communication is generally held by the queue engine until the agent becomes available. While a customer is waiting for an agent, ACD 130 may collect data from the customer or perform other automated processes. Once the agent is available, the distributor engine routes the communication to the agent.

In one embodiment, the telephony server 134 includes a trunk interface that utilizes conventional telephony trunk transmission supervision and signaling protocols required to interface with the outside trunk circuits from the PSTN 102. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The telephony server 134 includes hardware and software components to interface with the LAN 132 of the contact center 100. In one embodiment, the LAN 132 may utilize IP telephony, which integrates audio and video stream control with legacy telephony functions and may be supported through the H.323 protocol. H.323 is an International Telecommunication Union (ITU) telecommunications protocol that defines a standard for providing voice and video services over data networks. H.323 permits users to make point-to-point audio and video phone calls over a local area network. IP telephony systems can be integrated with the public telephone system through an IP/PBX-PSTN gateway, thereby allowing a user to place telephone calls from an enabled computer. For example, a call from an IP telephony client within the contact center 100 to a conventional telephone outside of the contact center would be routed via the LAN132 to the IP/PBX-PSTN gateway. The IP/PBX-PSTN gateway would then translate the H.323 protocol to conventional telephone protocol and route the call over the PSTN 102 to its destination. Conversely, an incoming call from a customer over the PSTN 102 may be routed to the IP/PBX-PSTN gateway, which translates the conventional telephone protocol to H.323 protocol so that it may be routed to a VoIP-enable phone or computer within the contact center 100.

The contact center 100 is further communicatively coupled to the Internet 104 via hardware and software components within the LAN 132. One of ordinary skill in the art would recognize that the LAN 132 and the connections between the contact center 100 and external networks such as the PSTN 102 and the Internet 104 as illustrated by FIG. 2 have been simplified for the sake of clarity and the contact center may include various additional and/or different software and hardware networking components such as routers, switches, gateways, network bridges, hubs, and legacy telephony equipment.

As shown in FIG. 2, the contact center 100 includes a plurality of agent workstations 140 that enable agents employed by the contact center 100 to engage in customer interactions over a plurality of communication channels. In one embodiment, each agent workstation 140 may include at least a telephone and a computer workstation. In other embodiments, each agent workstation 140 may include a computer workstation that provides both computing and telephony functionality. Through the workstations 140, the agents may engage in telephone conversations with the customer, respond to email inquiries, receive faxes, engage in instant message conversations, text (e.g., SMS, MMS), respond to website-based inquires, video chat with a customer, and otherwise participate in various customer interaction sessions across one or more channels including social media postings (e.g., Facebook, LinkedIn, etc.). Further, in some embodiments, the agent workstations 140 may be remotely located from the contact center 100, for example, in another city, state, or country. Alternatively, in some embodiments, an agent may be a software-based application configured to interact in some manner with a customer. An exemplary software-based application as an agent is an online chat program designed to interpret customer inquiries and respond with pre-programmed answers.

The contact center 100 further includes a contact center control system 142 that is generally configured to provide recording, voice analysis, behavioral analysis, text analysis, storage, and other processing functionality to the contact center 100. In the illustrated embodiment, the contact center control system 142 is an information handling system such as a computer, server, workstation, mainframe computer, or other suitable computing device. In other embodiments, the control system 142 may be a plurality of communicatively coupled computing devices coordinated to provide the above functionality for the contact center 100. The control system 142 includes a processor 144 that is communicatively coupled to a system memory 146, a mass storage device 148, and a communication module 150. The processor 144 can be any custom made or commercially available processor, a central processing unit (CPU), an auxiliary processor among several processors associated with the control system 142, a semiconductor-based microprocessor (in the form of a microchip or chip set), a macroprocessor, a collection of communicatively coupled processors, or any device for executing software instructions. The system memory 146 provides the processor 144 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data, such as known voice prints, may be stored on the mass storage device 148. Examples of mass storage devices may include hard discs, optical disks, magneto-optical discs, solid-state storage devices, tape drives, CD-ROM drives, and/or a variety of other mass storage devices known in the art. Further, the mass storage device may be implemented across one or more network-based storage systems, such as a storage area network (SAN). The communication module 150 is operable to receive and transmit contact center-related data between local and remote networked systems and communicate information such as customer interaction recordings between the other components coupled to the LAN 132. Examples of communication modules may include Ethernet cards, 802.11 WiFi devices, cellular data radios, and/or other suitable devices known in the art. The contact center control system 142 may further include any number of additional components, which are omitted for simplicity, such as input and/or output (I/O) devices (or peripherals), buses, dedicated graphics controllers, storage controllers, buffers (caches), and drivers. Further, functionality described in association with the control system 142 may be implemented in software (e.g., computer instructions), hardware (e.g., discrete logic circuits, application specific integrated circuit (ASIC) gates, programmable gate arrays, field programmable gate arrays (FPGAs), etc.), or a combination of hardware and software.

According to one aspect of the present disclosure, the contact center control system 142 is configured to record, collect, and analyze customer voice data and other structured and unstructured data, and other tools may be used in association therewith to increase efficiency and efficacy of the contact center. As an aspect of this, the control system 142 is operable to record unstructured interactions between customers and agents occurring over different communication channels including without limitation telephone conversations, email exchanges, website postings, social media communications, smartphone application (i.e., app) communications, fax messages, texts (e.g., SMS, MMS, etc.), and instant message conversations. For example, the control system 142 may include a hardware or software-based recording server to capture the audio of a standard or VoIP telephone connection established between an agent workstation 140 and an outside customer telephone system. Further, the audio from an unstructured telephone call or video conference session (or any other communication channel involving audio or video, e.g., a Skype call) may be transcribed manually or automatically and stored in association with the original audio or video. In one embodiment, multiple communication channels (i.e., multi-channel) may be used, either in real-time to collect information, for evaluation, or both. For example, control system 142 can receive, evaluate, and store telephone calls, emails, and fax messages. Thus, multi-channel can refer to multiple channels of interaction data, or analysis using two or more channels, depending on the context herein.

In addition to unstructured interaction data such as interaction transcriptions, the control system 142 is configured to captured structured data related to customers, agents, and their interactions. For example, in one embodiment, a "cradle-to-grave" recording may be used to record all information related to a particular telephone call from the time the call enters the contact center based on the later of: the caller hanging up or the agent completing the transaction. All or a portion of the interactions during the call may be recorded, including interaction with an interactive voice response (IVR) system, time spent on hold, data keyed through the caller's key pad, conversations with the agent, and screens displayed by the agent at his/her station during the transaction. Additionally, structured data associated with interactions with specific customers may be collected and associated with each customer, including without limitation the number and length of calls placed to the contact center, call origination information, reasons for interactions, outcome of interactions, average hold time, agent actions during interactions with customer, manager escalations during calls, types of social media interactions, number of distress events during interactions, survey results, and other interaction information. In addition to collecting interaction data associated with a customer, the control system 142 is also operable to collect biographical profile information specific to a customer including without limitation customer phone number, account/policy numbers, address, employment status, income, gender, race, age, education, nationality, ethnicity, marital status, credit score, customer "value" data (i.e., customer tenure, money spent as customer, etc.), personality type (as determined by past interactions), and other relevant customer identification and biological information. The control system 142 may also collect agent-specific unstructured and structured data including without limitation agent personality type, gender, language skills, technical skills, performance data (e.g., customer retention rate, etc.), tenure and salary data, training level, average hold time during interactions, manager escalations, agent workstation utilization, and any other agent data relevant to contact center performance. Additionally, one of ordinary skill in the art would recognize that the types of data collected by the contact center control system 142 that are identified above are simply examples and additional and/or different interaction data, customer data, agent data, and telephony data may be collected and processed by the control system 142.

The control system 142 may store recorded and collected interaction data in a database 152, including customer data and agent data. In certain embodiments, agent data, such as agent scores for dealing with customers, are updated daily.

The control system 142 may store recorded and collected interaction data in a database 152. The database 152 may be any type of reliable storage solution such as a RAID-based storage server, an array of hard disks, a storage area network of interconnected storage devices, an array of tape drives, or some other scalable storage solution located either within the contact center or remotely located (i.e., in the cloud). Further, in other embodiments, the contact center control system 142 may have access not only to data collected within the contact center 100 but also data made available by external sources such as a third-party database 154. In certain embodiments, the control system 142 may query the third-party database for customer data such as credit reports, past transaction data, and other structured and unstructured data.

Additionally, in some embodiments, an analytics system 160 may also perform some or all of the functionality ascribed to the contact center control system 142 above. For instance, the analytics system 160 may record telephone and internet-based interactions, and/or perform behavioral analyses. The analytics system 160 may be integrated into the contact center control system 142 as a hardware or software module and share its computing resources 144, 146, 148, and 150, or it may be a separate computing system housed, for example, in the analytics center 120 shown in FIG. 1. In the latter case, the analytics system 160 includes its own processor and non-transitory computer-readable storage medium (e.g., system memory, hard drive, etc.) on which to store analytics software and other software instructions.

Figure 3:
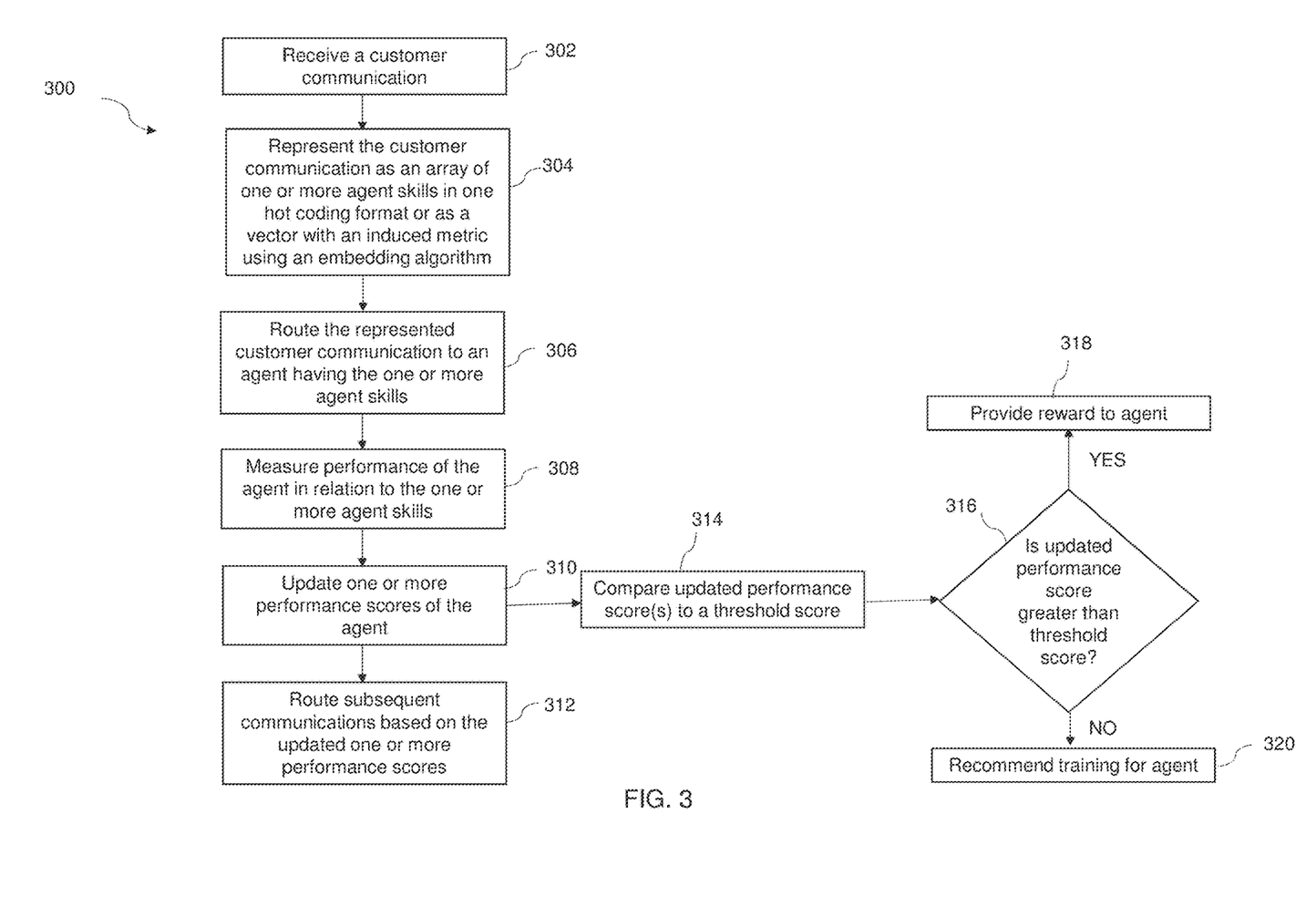
FIG. 3 is a flowchart of a method according to embodiments of the present disclosure.

Referring now to FIG. 3, a method 300 for routing customer communications is described. At step 302, ACD 130 receives a customer communication. The communication type may include any of the channels discussed herein or available to those of ordinary skill in the art, including without limitation one or more voice calls, voice over IP, facsimiles, emails, web page submissions, internet chat sessions, wireless messages (e.g., text messages such as SMS (short messaging system) messages or paper messages), short message service (SMS), multimedia message service (MMS), or social media (e.g., Facebook identifier, Twitter identifier, etc.), IVR telephone sessions, voicemail messages (including emailed voice attachments), or any combination thereof. In one embodiment, the communication is a telephonic interaction.

At step 304, ACD 130 represents the customer communication as an array of one or more agent skills desired to handle the customer communication in one hot coding format or as a vector with an induced metric using an embedding algorithm.

One hot encoding is a representation of categorical variables as binary vectors, and is the natural way to represent the customer communication. For example, consider an agent having experience in five skills (billing, charging, technical, retainment/retention, and Spanish). A customer communication in Spanish is received for a customer that wishes to stop doing business with the company ("churn").

Each agent skill can be represented as follows:

> Billing =[1,0,0,0,0]
> Charging =[0,1,0,0,0]
> Technical =[0,0,1,0,0]
> Retainment =[0,0,0,1,0]
> Spanish =[0,0,0,0,1]

The customer communication is therefore represented as vector [0,0,0,1,1] (combined vector of retainment and Spanish skills). This vector indicates which agent skills are to be called in a table of agent skills.

A more sophisticated approach to representing the customer communication is to use an embedding algorithm, which can provide insights that may allow a certain level of compression. Each presentation of the agent skill is converted to a vector with an induced metric. Auto encoders may be considered for this purpose.

Auto encoders are deep learning engines that were originally specified for mapping data with high dimensions to data with lower dimensions. Thus, they are commonly used in image applications as well as text (such as embedding). Auto encoders include: (1) an encoder and (2) a decoder. The encoder receives real data (such as images or sentences in their one hot coding format), and through a sequence of deep learning layers (mainly deep neural learning (DNN) or long short-term memory (LSTM)), maps the data into a smaller dimension. The decoder in turn takes the output of the encoder and remaps it to the original data. Training includes measuring the distance between the input of the encoder and the output of the decoder.

Using a keras model:

| Layer (Type) | Output Shape | Parameter # |
|---|---|---|
| input (InputLayer) | (None, 5) | N/A |
| dense_1 (Dense) | (None, 4) | N/A |
| leaky_re_lu_1 (LeakyReLU) | (None, 4) | N/A |
| Embedd (Dense) | (None, 3) | N/A |

In an exemplary embodiment, the auto encoder can be trained to create the function f:

$$D(f([0,0,0,0,1]),f([0,0,0,1,1]))<(D(f([0,1,0,0,0]),f([0,0,0,1,0])))$$

At step 306, ACD 130 routes the represented customer communication to an agent having the one or more agent skills desired to handle the customer communication. For example, the represented customer communication can be matched to a table of skills for an agent to determine if the agent is capable of or adept at handling the communication.

At step 308, ACD 130 measures the performance of the agent in relation to the one or more agent skills during or after the customer communication. In various embodiment, ACD 130 defines a KPI in relation to each of the one or more agent skills and measures each KPI during or after the customer communication.

KPIs are a measurable value that demonstrates how effectively a company, department, team, or individual is achieving business goals. The KPIs analyze and help identify synergies, opportunities and improvement areas. The KPIs are flexible and can be any type of performance indicator, such as one or more of a call length, a satisfaction survey score, or a customer desire for another agent. In some embodiments, the KPIs include sales per agent, active waiting calls, longest call hold, peak hour traffic, revenue per successful call, call center status metrics, call abandonment, handle time, cost per call, on hold time, call resolution, repeat calls, or any combination thereof.

At step 310, ACD 130 updates, in real-time, one or more performance scores of the agent in a skill profile or table. The one or more performance scores are related to the one or more agent skills. Advantageously, in various embodiments, ACD 130 automatically computes an agent's effective skill level and automatically updates the agent's effective skill level as changes in the agent's effective skills are measured so the agent's effective skill level is up-to-date.

In one example, after the KPI is measured, the old score for the agent skill (i.e., an older aggregated KPI score) is updated based on an update rule, which can be any weighted mean, median, or average. The old KPI score is then replaced with a new KPI score.

In another example, a median time duration is used to update a score. The historical call lengths of an agent can be considered:

> List_of_min=[1.5,2,1.6,3.1,3.2,2.5,4.1,3.7]

The call length for a current communication is measured at 3 minutes and 45 seconds (3.75 minutes).

```
  List_of_min.append(3.75)
  List_of_min.sort( )
4 len_history =len( List_of_min)
5 score =list_of_min[len_histor/2]
6 F[billing]=score
```

In yet another example, the previous score is used and a weighting for each score is applied (e.g., 0.9 of the old score and 0.1 of the new score):

```
Old_score=F[billing]
List_of_min.append(3.75) #just for tracking
New_score =0.9*old_score+0.1*3.75
F[billing]=new_score
```

In an additional example, every communication receives a score between 0 to 10. Previous customer satisfaction scores of the agent may be [1, 0, 1, 10, 9, 1, 3, 4, 9]. After an agent takes a customer communication, the agent receives a score of 9. Again, the old score and the new score can be given different weights to calculate an updated score (e.g., 0.9 for old score and 0.1 for new score).

```
  List_of_survey.append(9)
  Old_score=F[billing]
1 New_score =0.9*old_score+0.1*9
2 F[billing]=new_score
```

If the communication is labeled with more than a single skill (e.g., [0,0,1,0,1] or [1,1,0,0,0]), the above process is performed for each skill:

```
F[billing]=0.1*9+0.9*old_score_billing
F[financial]=0.1*9+0.9*old_score_financial
```

In certain embodiments, as shown in step 314, a threshold score for each KPI is defined, and the threshold score for each KPI is compared to each updated performance score. The KPI estimates the agent's skill, and may differ from skill to skill. Accordingly, the threshold (or threshold score) for each KPI may differ for each skill since different skills may imply different distributions. The thresholds may derive as percentiles of the KPI distributions.

In some embodiments, as shown in step 316, ACD 130 determines if the updated performance score(s) are greater than the respective threshold score. ACD 130 may provide an alert to an agent supervisor when an updated performance score is above or below the threshold score for a respective KPI. If the agent's updated score is above the threshold, the agent may receive a reward as shown in step 318. In several embodiments, when the updated performance score is above the threshold score, the agent is rewarded. For example, the agent may be given a bonus. If the agent's updated score is below the threshold, the agent supervisor can determine whether the agent needs more training or in extreme circumstances, whether the skill should be removed from the profile of the agent. In certain embodiments, ACD 130 recommends training of the agent or removal of an agent skill from the skill profile when the updated performance score is below the threshold score for the respective KPI as shown in step 320.

At step 312, ACD 130 routes subsequent customer communications based on the updated one or more performance scores.

In several embodiments, the skill level of the agent is continuously and automatically monitored and updated to ensure that each customer communication received is routed to the best agent. Accordingly, in certain embodiments, ACD 130 routes a plurality of additional customer communications to the agent based on the skill profile of the agent, continuously measures performance of the agent in relation to a skill in the skill profile during or after each additional customer communication, continuously updates, in real-time, a performance score of the agent in the skill profile, and routes a plurality of future customer communications based on the updated performance score.

In some embodiments, ACD 130 displays the one or more updated performance scores of the agent, one or more trends in the one or more performance scores of the agent, or both, on a graphical user interface. For example, a supervisor dashboard to review skills and trends of different agents may be provided. The dashboard allows supervisors to monitor trends of skills over time for agents and teams. Advantageously, the dashboard allows managers to monitor agents' performances and make decisions regarding training, updating proficiencies, or in extreme events, removing a skill from an agent profile.

Figure 4A:
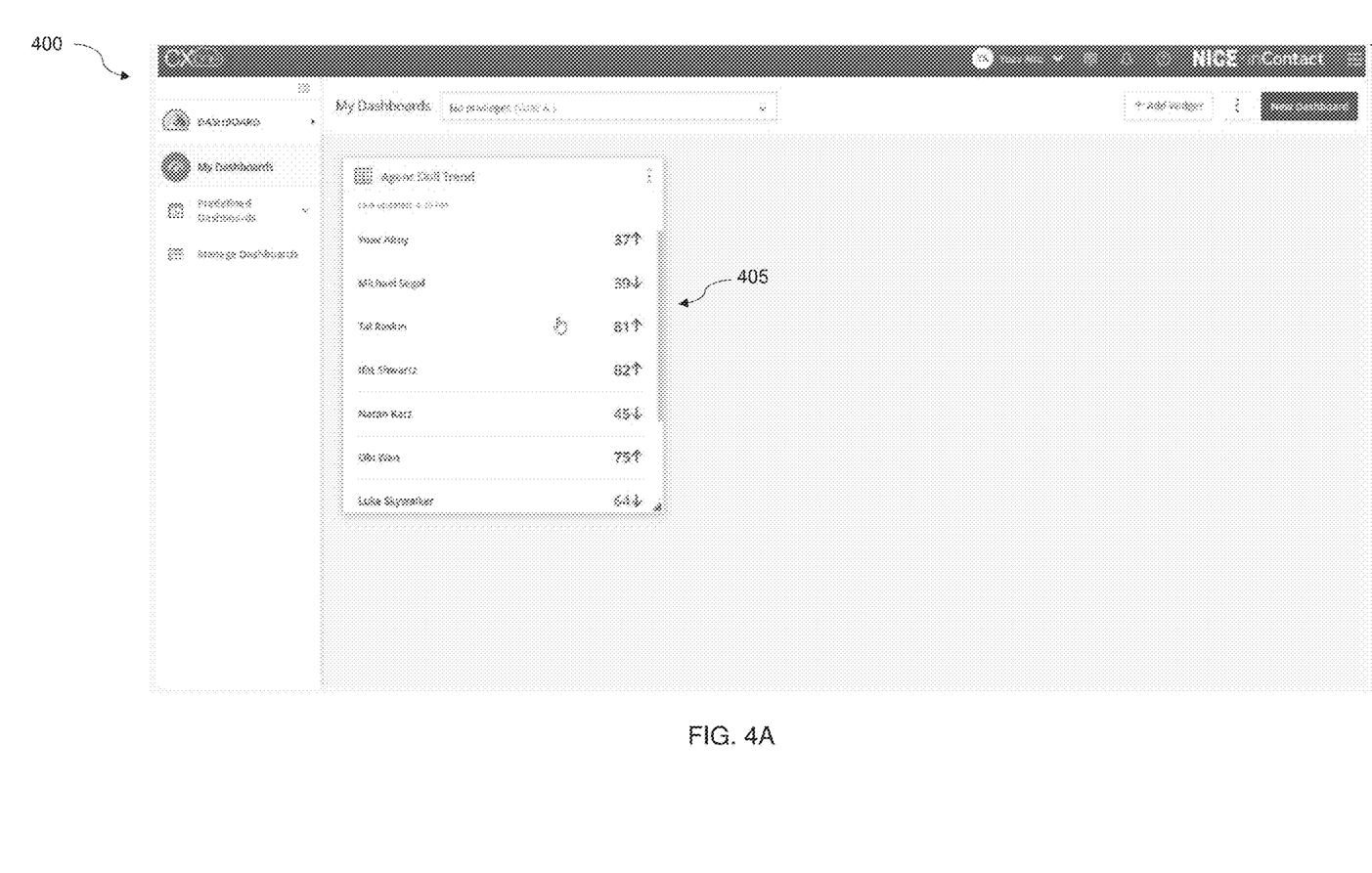
FIGS. 4A-4C are screenshots of a supervisor dashboard according to embodiments of the present disclosure.

The algorithms described above may advantageously provide insights on an agent's performance against the skills assigned to the agent. The dashboard may be refreshed every few seconds, for example, to present new scores and trends for each agent in real-time. For example, referring to FIG. 4A, an exemplary dashboard 400 is illustrated that includes a list 405 of agents, their scores, and trends of their scores. As can be seen, scores for Yoav Alroy, Tal Raskin, Ifat Shwartz, and Obi Wan are trending upwards, while scores for Michael Segal, Natan Katz, and Luke Skywalker are trending downwards. In an exemplary embodiment, scores that are trending upwards are displayed in green, while scores that are trending downwards are displayed in red. Alternative colors may be used, of course.

Figure 4B:
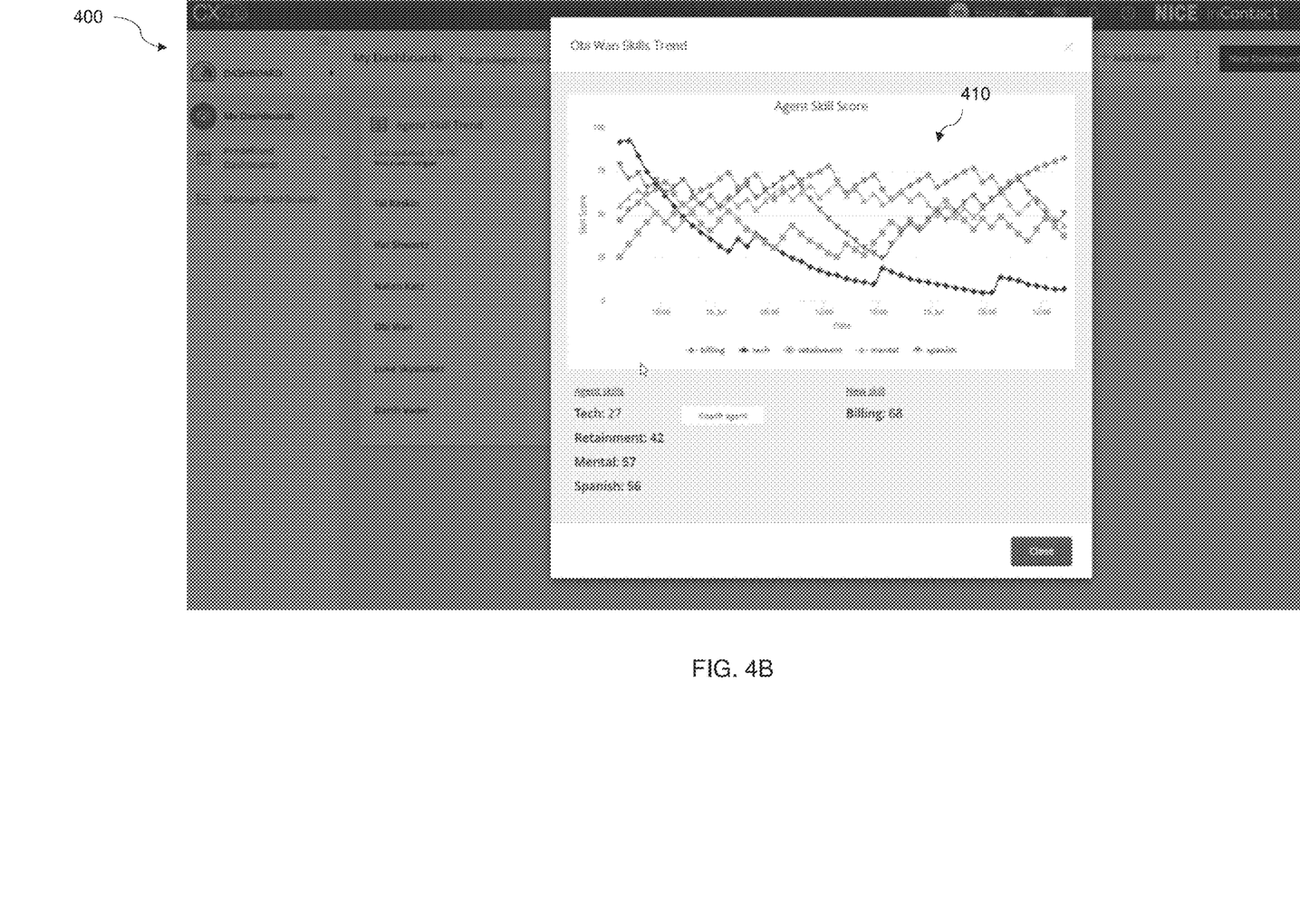
Figure 4C:
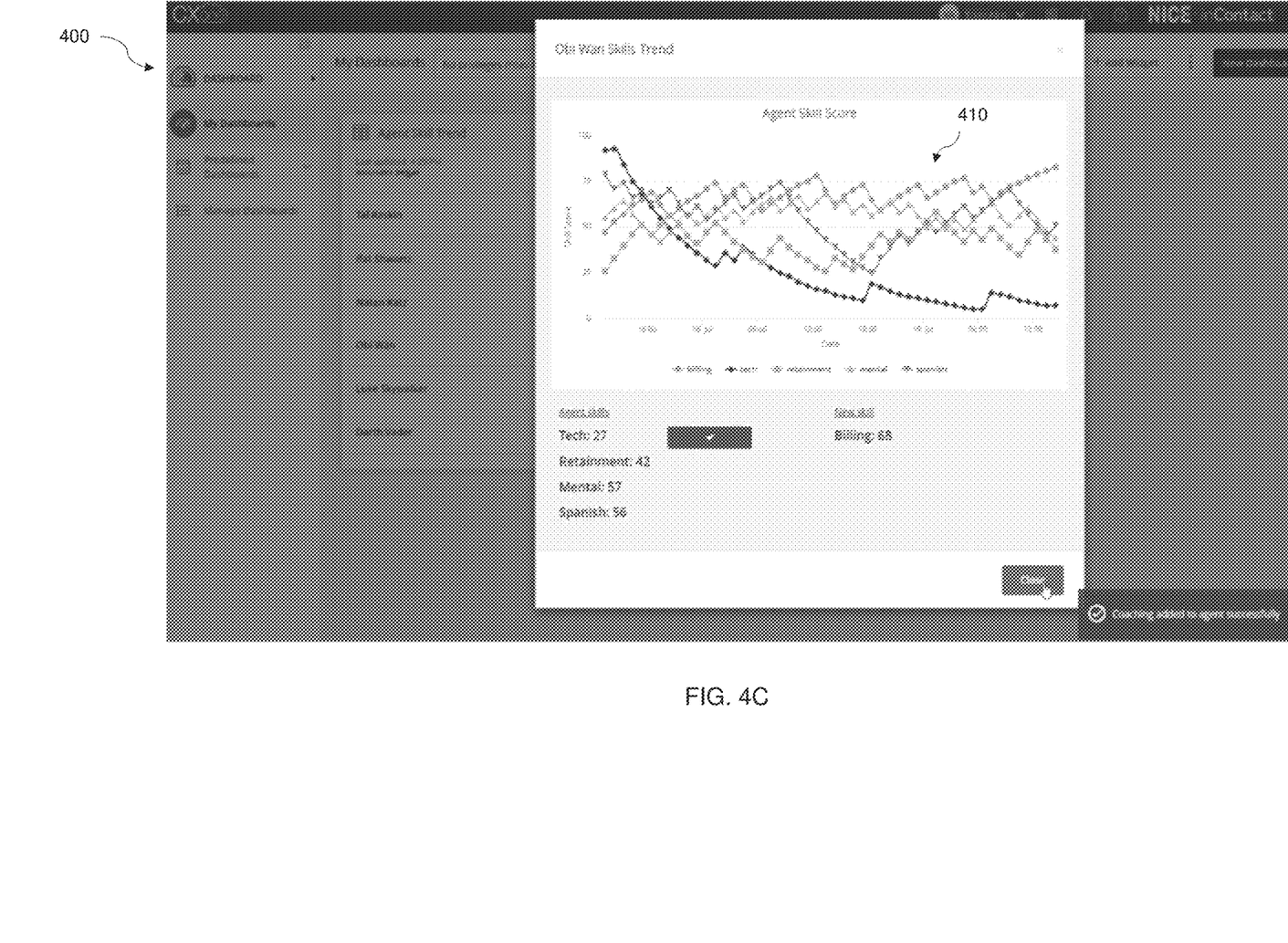

In FIG. 4B, a graphical representation 410 of the skills trends for Obi Wan is provided for a variety of skills (technology, retainment, mental, and Spanish), along with the current scores for Obi Wan's skills. A new skill (billing) has also been added to Obi Wan's profile. As illustrated, Obi Wan's technology skills are on a downward trend, and this trend is highlighted for the agent supervisor, along with a recommendation that the agent should be provided training or coaching. In FIG. 4C, the supervisor selects the "coach agent" button so that Obi Wan can be provided with appropriate training.

Thus, the supervisor can monitor the trends and easily identify agents with a negative trend for a given skill, set of skills, or in general, and may also be able to identify agents having merely an off-day that is not a trend or indicative of general performance. The supervisor can zoom into a specific agent's performance by clicking on the agent name in the list. A detailed view appears with the agent's skills and score trends over time. The agent skill scores trend view allows the supervisor to identify skills with negative trends and assign a training plan for improvement or to take alternative action(s).

Figure 5:
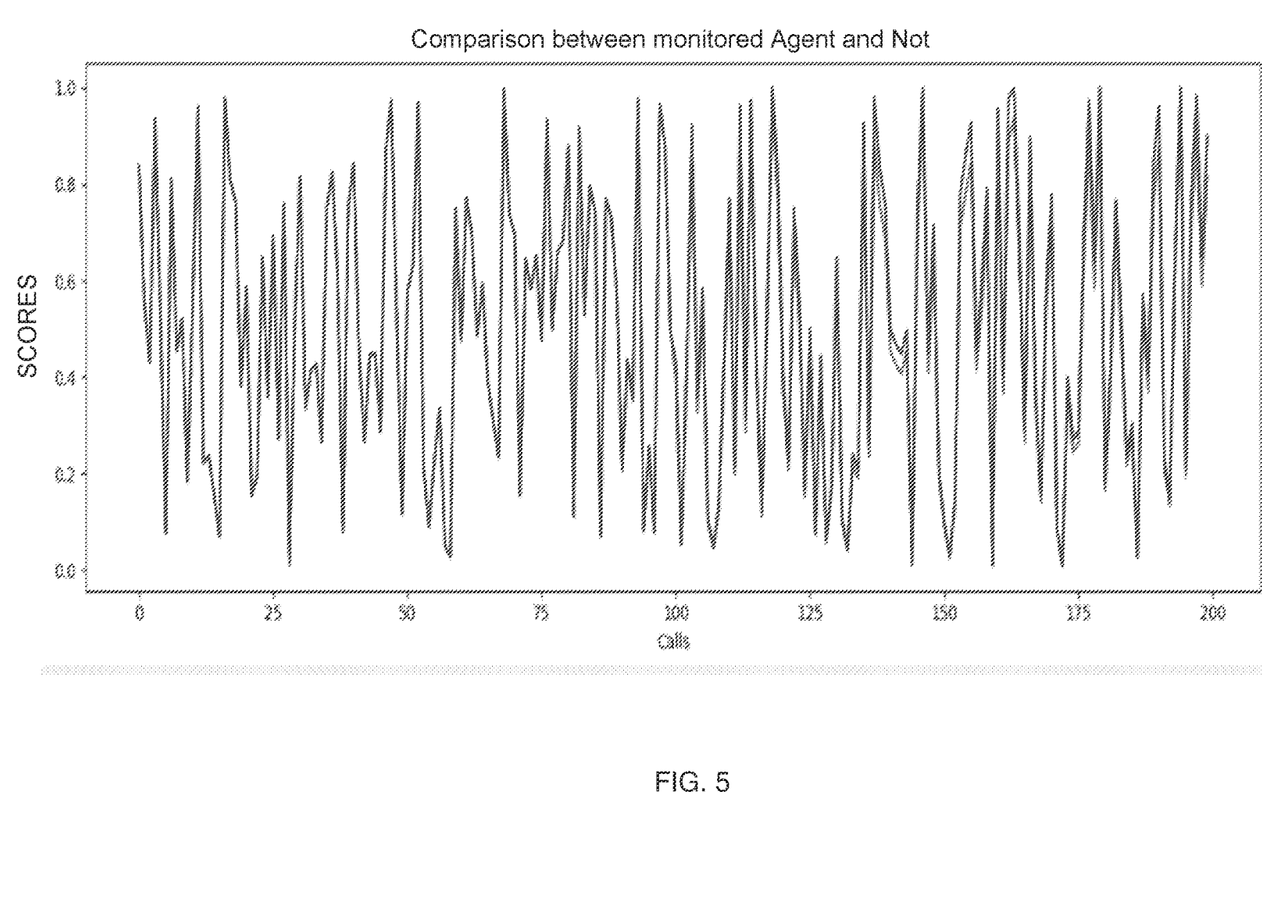
FIG. 5 is a graph displaying the difference in scores between agents that are monitored according to embodiments of the present disclosure and agents that are not.

Referring now to FIG. 5, shown is a graph displaying the difference in scores between agents who are continuously monitored according to the present disclosure and agents who are not. Monitoring the agents continuously creates an advantage in the scores as time progresses, as the monitored agents generally have higher scores than agents who are not monitored.

Figure 6:
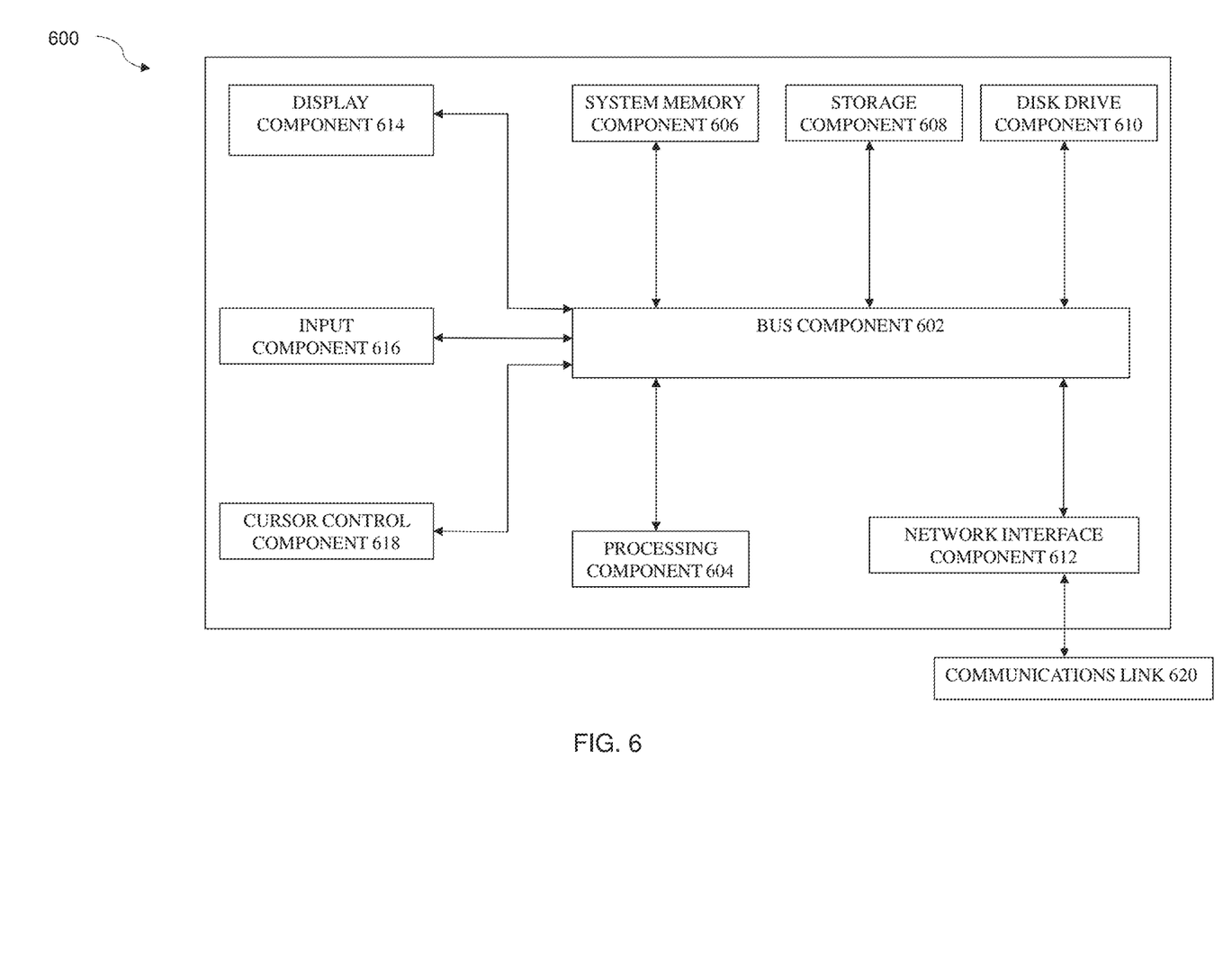
FIG. 6 is a block diagram of a computer system suitable for implementing one or more components in FIG. 1 or 2 according to one embodiment of the present disclosure.

Referring now to FIG. 6, illustrated is a block diagram of a system 600 suitable for implementing embodiments of the present disclosure, including ACD 130. System 600, such as part a computer and/or a network server, includes a bus 602 or other communication mechanism for communicating information, which interconnects subsystems and components, including one or more of a processing component 604 (e.g., processor, micro-controller, digital signal processor (DSP), etc.), a system memory component 606 (e.g., RAM), a static storage component 608 (e.g., ROM), a network interface component 612, a display component 614 (or alternatively, an interface to an external display), an input component 616 (e.g., keypad or keyboard), and a cursor control component 618 (e.g., a mouse pad).

In accordance with embodiments of the present disclosure, system 600 performs specific operations by processor 604 executing one or more sequences of one or more instructions contained in system memory component 606. Such instructions may be read into system memory component 606 from another computer readable medium, such as static storage component 608. These may include instructions to measure performance of an agent, update performance score of an agent, and route customer communications based on the updated performance score of the agent. In other embodiments, hard-wired circuitry may be used in place of or in combination with software instructions for implementation of one or more embodiments of the disclosure.

Logic may be encoded in a computer readable medium, which may refer to any medium that participates in providing instructions to processor 604 for execution. Such a medium may take many forms, including but not limited to, non-volatile media, volatile media, and transmission media. In various implementations, volatile media includes dynamic memory, such as system memory component 606, and transmission media includes coaxial cables, copper wire, and fiber optics, including wires that comprise bus 602. Memory may be used to store visual representations of the different options for searching or auto-synchronizing. In one example, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by system 600. In various other embodiments, a plurality of systems 600 coupled by communication link 620 (e.g., networks 102 or 104 of FIG. 2, LAN 132, WLAN, PTSN, or various other wired or wireless networks) may perform instruction sequences to practice the disclosure in coordination with one another. Computer system 600 may transmit and receive messages, data, information and instructions, including one or more programs (i.e., application code) through communication link 620 and communication interface 612. Received program code may be executed by processor 604 as received and/or stored in disk drive component 610 or some other non-volatile storage component for execution.

The Abstract at the end of this disclosure is provided to comply with 37 C.F.R. § 1.72(b) to allow a quick determination of the nature of the technical disclosure. It is submitted with the understanding that it will not be used to interpret or limit the scope or meaning of the claims.

What is claimed is:

1. An agent skill management system comprising:
a processor and a computer readable medium operably coupled thereto, the computer readable medium comprising a plurality of instructions stored in association therewith that are accessible to, and executable by, the processor, to perform operations which comprise:
receiving a customer communication;
representing the customer communication as a vector of one or more agent skills desired to handle the customer communication, the vector having an induced metric, wherein an auto encoder is used to convert the one or more agent skills to the vector having an induced metric;
routing the represented customer communication to an agent having the one or more agent skills;
measuring performance of the agent in relation to the one or more agent skills during or after the customer communication based on data analysis using reinforcement learning;
updating, in real-time, one or more performance scores of the agent in a skill profile based on data analysis using reinforcement learning, wherein the one or more performance scores are related to the one or more agent skills; and
routing subsequent customer communications based on the updated one or more performance scores.

2. The agent skill management system of claim 1, wherein measuring performance of the agent comprises:
defining a key performance indicator (KPI) in relation to each of the one or more agent skills; and
measuring each KPI during or after the customer communication.

3. The agent skill management system of claim 2, wherein the KPI comprises one or more of a call length, a satisfaction survey score, or a customer desire for another agent.

4. The agent skill management system of claim 2, wherein the operations further comprise:
defining a threshold score for each KPI; and
comparing the threshold score for each KPI to each updated performance score.

5. The agent skill management system of claim 4, wherein the operations further comprise providing an alert to an agent supervisor when an updated performance score is above or below the threshold score for a respective KPI.

6. The agent skill management system of claim 5, wherein the operations further comprise recommending training of the agent or removal of an agent skill from the skill profile when the updated performance score is below the threshold score for the respective KPI.

7. The agent skill management system of claim 1, wherein the operations further comprise:
routing a plurality of additional customer communications to the agent based on the skill profile of the agent;
continuously measuring performance of the agent in relation to a skill in the skill profile during or after each additional customer communication;
continuously updating, in real-time, a performance score of the agent in the skill profile, wherein the performance score is related to the skill in the skill profile; and
routing a plurality of future customer communications based on the updated performance score.

8. A method, which comprises:
receiving, by a processor, a customer communication;

representing, by a processor, the customer communication as a vector of one or more agent skills desired to handle the customer communication, the vector having an induced metric, wherein an auto encoder is used to convert the one or more agent skills to the vector having an induced metric;

routing the represented customer communication to an agent having the one or more agent skills;

measuring, by a processor, performance of the agent in relation to the one or more agent skills during or after the customer communication based on data analysis using reinforcement learning;

updating, by a processor in real-time, one or more performance scores of the agent in a skill profile based on data analysis using reinforcement learning, wherein the one or more performance scores are related to the one or more agent skills; and routing subsequent customer communications based on the updated one or more performance scores.

9. The method of claim 8, wherein measuring performance of the agent comprises:

defining, by a processor, a key performance indicator (KPI) in relation to each of the one or more agent skills; and measuring, by a processor, each KPI during or after the customer communication.

10. The method of claim 9, further comprising:
defining a threshold score for each KPI; and
comparing the threshold score for each KPI to each updated performance score.

11. The method of claim 10, further comprising providing an alert to an agent supervisor when an updated performance score is above or below the threshold score for a respective KPI.

12. The method of claim 8, wherein further comprising:
routing a plurality of additional customer communications to the agent based on the skill profile of the agent;
continuously measuring, by a processor, performance of the agent in relation to a skill in the skill profile during or after each additional customer communication;
continuously updating, by a processor in real-time, a performance score of the agent in the skill profile, wherein the performance score is related to the skill in the skill profile; and
routing a plurality of future customer communications based on the updated performance score.

13. A non-transitory computer-readable medium having stored thereon computer-readable instructions executable by a processor to perform operations which comprise:
receiving a customer communication;
representing the customer communication as a vector of one or more agent skills desired to handle the customer communication, the vector having an induced metric, wherein an auto encoder is used to convert the one or more agent skills to the vector having an induced metric;

routing the represented customer communication to an agent having the one or more agent skills;

measuring performance of the agent in relation to the one or more agent skills during or after the customer communication based on data analysis using reinforcement learning;

updating, in real-time, one or more performance scores of the agent in a skill profile, wherein the one or more performance scores are related to the one or more agent skills based on data analysis using reinforcement learning; and routing subsequent customer communications based on the updated one or more performance scores.

14. The non-transitory computer-readable medium of claim 13, wherein measuring performance of the agent comprises:

defining, by a processor, a key performance indicator (KPI) in relation to each of the one or more agent skills; and measuring, by a processor, each KPI during or after the customer communication.

15. The non-transitory computer-readable medium of claim 14, wherein the operations further comprise:
defining a threshold score for each KPI; and
comparing the threshold score for each KPI to each updated performance score.

16. The non-transitory computer-readable medium of claim 15, wherein the operations further comprise providing an alert to an agent supervisor when an updated performance score is above or below the threshold score for a respective KPI.

17. The non-transitory computer-readable medium of claim 13, wherein the operations further comprise:
routing a plurality of additional customer communications to the agent based on the skill profile of the agent;
continuously measuring performance of the agent in relation to a skill in the skill profile during or after each additional customer communication;
continuously updating, in real-time, a performance score of the agent in the skill profile, wherein the performance score is related to the skill in the skill profile; and
routing a plurality of future customer communications based on the updated performance score.

* * * * *